(12) United States Patent
Leenstra et al.

(10) Patent No.: US 11,461,474 B2
(45) Date of Patent: Oct. 4, 2022

(54) PROCESS-BASED VIRTUALIZATION SYSTEM FOR EXECUTING A SECURE APPLICATION PROCESS

(71) Applicant: International Business Machines Corporation, Armonk, NY (US)

(72) Inventors: Jentje Leenstra, Bondorf (DE); Paul Mackerras, Weston (AU); Benjamin Herrenschmidt, Lyneham (AU); Bradly George Frey, Austin, TX (US); John Martin Ludden, Essex Junction, VT (US); Guerney D. H. Hunt, Yorktown Heights, NY (US); David Campbell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 16/751,234

(22) Filed: Jan. 24, 2020

(65) Prior Publication Data
US 2021/0232693 A1 Jul. 29, 2021

(51) Int. Cl.
*G06F 21/00* (2013.01)
*G06F 21/60* (2013.01)
(Continued)

(52) U.S. Cl.
CPC ........ *G06F 21/602* (2013.01); *G06F 9/30101* (2013.01); *G06F 9/45558* (2013.01); *G06F 12/10* (2013.01); *G06F 2009/45587* (2013.01)

(58) Field of Classification Search
None
See application file for complete search history.

(56) References Cited

U.S. PATENT DOCUMENTS

| 7,707,411 B2 | 4/2010 | Bade et al. |
| 9,213,566 B2 * | 12/2015 | Morris ................ G06F 9/45537 |

(Continued)

FOREIGN PATENT DOCUMENTS

| CN | 105389197 A | 3/2016 |
| CN | 110059453 A | 7/2019 |
| EP | 3343419 A1 | 7/2018 |

OTHER PUBLICATIONS

Hunt et al., "Supporting protected computing on IBM Power Architecture", IBM, Mar. 22, 2018, 4 pages, <https://developer.ibm.com/articles/l-support-protected-computing/#>.

(Continued)

*Primary Examiner* — Jeffery L Williams
(74) *Attorney, Agent, or Firm* — Brian M. Restauro

(57) ABSTRACT

The present disclosure relates to a process-based virtualization system comprising a data processing unit. The system comprises a computer readable storage media, wherein a first memory component of the computer readable storage media is configured for access by an OS, secure and non-secure applications and the firmware, and wherein a second memory component of the computer readable storage media is configured for access by the firmware and not by the OS and the non-secure application. The data processing unit is configured to operate in a first mode of operation that executes a non-secure application process using the OS, and to operate in a second mode of operation that executes the secure application using the firmware, thereby executing application code using the second memory component.

20 Claims, 8 Drawing Sheets

(51) Int. Cl.
*G06F 9/455* (2018.01)
*G06F 9/30* (2018.01)
*G06F 12/10* (2016.01)

(56) References Cited

U.S. PATENT DOCUMENTS

| | | | |
|---|---|---|---|
| 9,811,364 B2 * | 11/2017 | Jacobson | G06F 9/45558 |
| 10,210,030 B2 * | 2/2019 | Brin | H04L 67/133 |
| 10,296,741 B2 | 5/2019 | Hall | |
| 10,387,686 B2 | 8/2019 | Boivie | |
| 10,437,628 B2 * | 10/2019 | Jacobson | G06F 9/45558 |
| 10,474,816 B2 | 11/2019 | Hall | |
| 10,664,592 B2 * | 5/2020 | De Gaetano | G06F 21/567 |
| 10,831,889 B2 | 11/2020 | Hall | |
| 11,176,245 B2 * | 11/2021 | Nunez Mencias | G06F 21/53 |
| 2013/0347095 A1 * | 12/2013 | Barjatiya | H04L 63/0428 726/13 |
| 2017/0078442 A1 | 3/2017 | Pacella | |
| 2019/0034628 A1 | 1/2019 | Hall et al. | |
| 2019/0034666 A1 | 1/2019 | Boivie et al. | |
| 2019/0392143 A1 * | 12/2019 | Hall | G06F 9/45558 |

OTHER PUBLICATIONS

Hunt, G., "Protected Execution Facility: Secure computing for Linux on OpenPOWER", IBM Research, Aug. 28, 2018, © 2018 IBM Corporation, 31 pages.

"Process-Based Virtualization System for Executing a Secure Application Process", Application No. PCT/IB2020/061730, filed on Dec. 10, 2020, 39 pages.

Axnix et al., "IBM z13 firmware innovations for simultaneous multithreading and I/O virtualization", IBM Journal of Research and Development, vol. 59, No. 4/5 Paper 11 Jul./Sep. 2015, 11 pages.

Patent Cooperation Treaty, PCT, International Search Report, and Written Opinion of the International Searching Authority, dated Mar. 23, 2021, International application No. PCT/IB2020/061730, International filing date Dec. 10, 2020, 7 pages.

\* cited by examiner

| MSR (S) BIT 220 | MSR (HV) BIT 230 | MSR (PR) BIT 240 | MODE OF OPERATION 210 | |
|---|---|---|---|---|
| 0 | 0 | 0 | PRIVILEGED | ← 254 |
| 0 | 0 | 1 | PROBLEM | ← 253 |
| 0 | 1 | 0 | HYPERVISOR | ← 252 |
| 0 | 1 | 1 | PROBLEM | ← 251 |
| 1 | 0 | 0 | PRIVILEGED | ← 244 |
| 1 | 0 | 1 | PROBLEM | ← 243 |
| 1 | 1 | 0 | ULTRAVISOR | ← 242 |
| 1 | 1 | 1 | SECURE APP PROBLEM | ← 241 |

Fig. 2

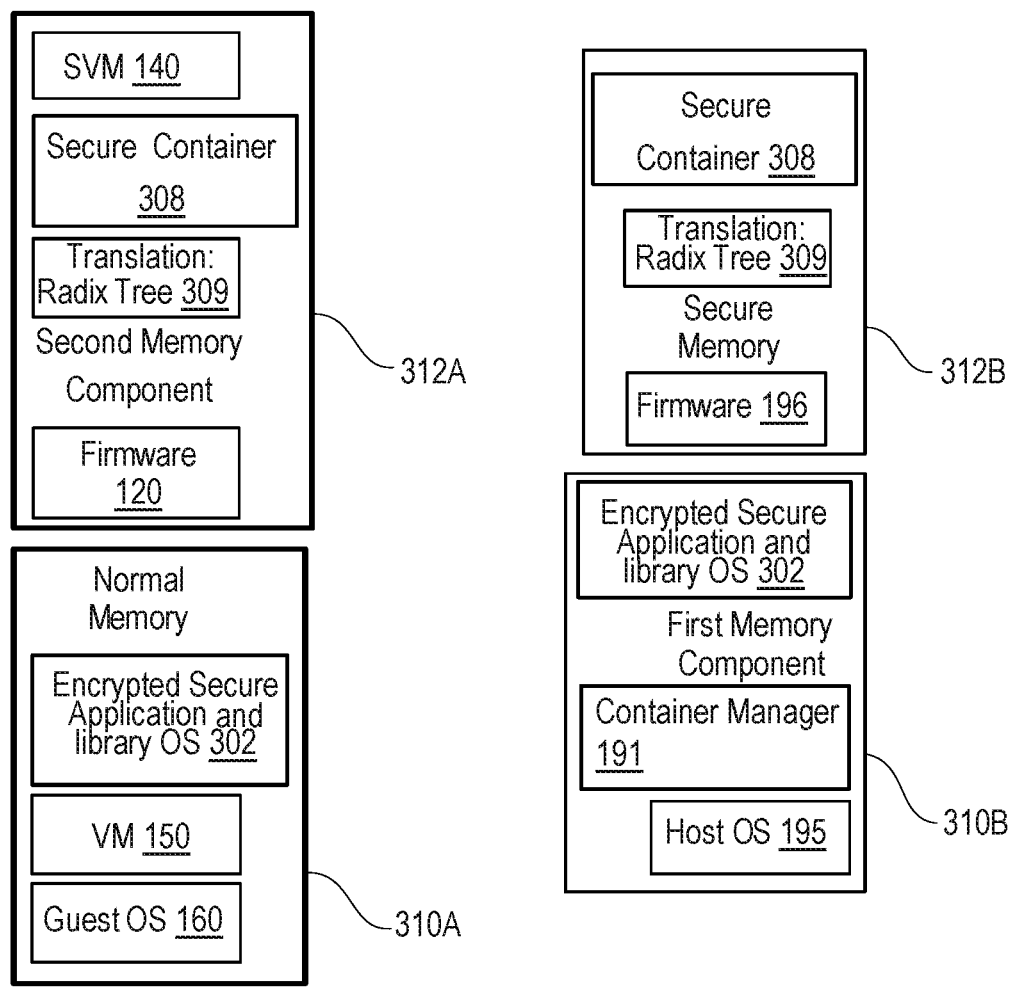

| Quadrant EA(0:1) | Hypervisor (Host OS) (S=0, HV=1, PR=0) | Guest OS (S=x, HV=0, PR=0) | Host App (S=0, HV=1, PR=1) | Guest App (S=x, HV=0, PR=1) | Secure Guest App (S=1, HV=1, PR=1) |
|---|---|---|---|---|---|
| 0 (00) | Not Valid: Segment Interrupt | effPID=PIDR effLPID=LPIDR (OS App Space: Guest OS runs here when it wants to access Guest App (S=0) space) | effPID=PIDR effLPID=0 (Host App Space: Host App runs here w/ PR=1) | effPID=PIDR effLPID=LPIDR (OS App Space: OS App runs here w/ PR=1) | effPID=SPIDR effLPID=FFF'x (Secure App runs here) |
| 1 (01) | effPID=PIDR effLPID=LPIDR (Hypervisor runs here when it wants to access Guest App address space (and Guest Secure App shared normal memory) | Not Valid: Segment Interrupt | Not Valid: Segment Interrupt | Not Valid: Segment Interrupt | effPID=PIDR effLPID=LPIDR (Non-secure App Space: Secure App runs here when it wants to access non-secured shared memory) |
| 2 (10) | effPID=0 effLPID=LPIDR (Hypervisor runs here when it wants to access Guest OS kernel address space) | Not Valid: Segment Interrupt | Not Valid: Segment Interrupt | Not Valid: Segment Interrupt | Not Valid: Segment Interrupt |
| 3 (11) | effPID=0 effLPID=0 (Hypervisor kernel space. hypervisor runs here) | effPID=0 effLPID=LPIDR (OS kernel space. OS kernel runs here) | Not Valid: Segment Interrupt | Not Valid: Segment Interrupt | Not Valid: Segment Interrupt |

Fig. 6A

| Quadrant EA(0:1) | Host OS (S=0, HV=1, PR=0) | Host App (S=0, HV=1, PR=1) | Secure Host App (S=1, HV=1, PR=1) |
|---|---|---|---|
| 0 (00) | effPID=PIDR effLPID=0 (Host OS runs here when it wants to access Host App address space and Secure App normal memory) | effPID=PIDR effLPID=0 (Host App Space: Host App runs here w/ PR=1) | effPID=PIDR effLPID=0 (Non-secure App Space: Secure App runs here when it wants to access non-secured shared memory) |
| 1 (01) | effPID=PIDR effLPID=0 Not used but same as Q0. (Host OS runs here when it wants to access Host App address space and Secure App normal memory) | Not Valid: Segment Interrupt | effPID=PIDR effLPID='001'x (Secure App runs here) |
| 2 (10) | effPID=0 effLPID=0 (Not used; as Q3) | Not Valid: Segment Interrupt | Not Valid: Segment Interrupt |
| 3 (11) | effPID=0 effLPID=0 (Host Operating System OS runs here) | Not Valid: Segment Interrupt | Not Valid: Segment Interrupt |

Fig. 6B

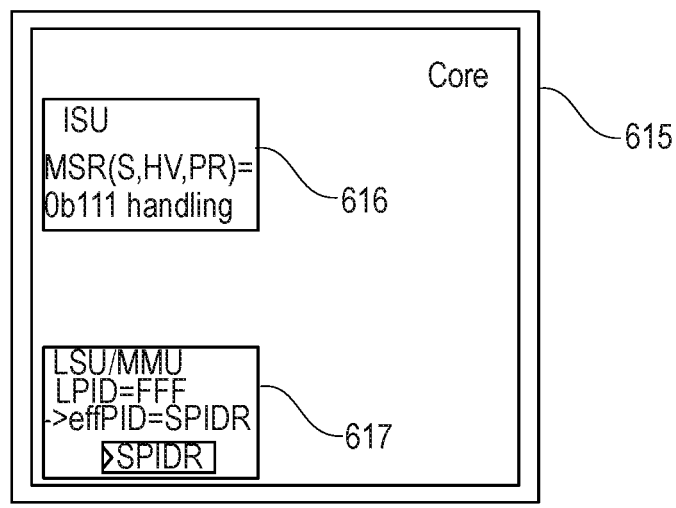

Fig. 6C

PROCESS-BASED VIRTUALIZATION SYSTEM FOR EXECUTING A SECURE APPLICATION PROCESS

BACKGROUND

The present invention relates to the field of digital computer systems, and more specifically, to a process-based virtualization system.

A container manager such as Docker is a set of coupled software-as-a-service and platform-as-a-service products that use operating-system-level virtualization to develop and deliver software in packages called containers. However, the execution of the containers may be vulnerable due to their dependence on the operating system where they are deployed.

SUMMARY

Various embodiments provide a method executing a secure application, process-based virtualization system and computer program product as described by the subject matter of the independent claims. Advantageous embodiments are described in the dependent claims. Embodiments of the present invention can be freely combined with each other if they are not mutually exclusive.

In one aspect, the invention relates to a process-based virtualization system comprising: a computer readable storage media (or machine-readable medium), wherein a first memory component of the computer readable storage media is configured for access by an operating system (OS), secure and non-secure applications and a firmware of the process-based virtualization system, and wherein a second memory component of the computer readable storage media is configured for access by the firmware and the secure application and not by the OS and not by the non-secure applications, the data processing unit being configured to operate in a first mode of operation that executes a non-secure application using the OS, and the data processing unit being configured to operate in a second mode of operation that executes the secure application using the firmware, thereby executing an application code of the secure application using the second memory component.

In one aspect, the invention relates to a method comprising providing a computer readable storage media, wherein a first memory component of the computer readable storage media is configured for access by an OS, secure and non-secure applications and a firmware, and wherein a second memory component of the computer readable storage media is configured for access by the firmware and the secure application and not by the OS and not by the non-secure applications, providing a data processing unit that is configured to operate in a first mode of operation that executes a non-secure application using the OS, and configuring the data processing unit to operate in a second mode of operation that executes the secure application using the firmware, thereby executing an application code of the secure application using the second memory component.

In another aspect, the invention relates to a computer program product comprising a computer-readable storage medium having computer-readable program code embodied therewith, the computer-readable program code configured to implement all of steps of the method according to preceding embodiments.

Still yet, any of the components of the present invention could be deployed, managed, serviced, etc., by a service provider who offers to implement process-based virtualization in a computer system. Embodiments of the present invention also provide and encompass related systems, methods, and/or program products.

BRIEF DESCRIPTION OF THE DRAWINGS

These and other features of this invention will be more readily understood from the following detailed description of the various aspects of the invention taken in conjunction with the accompanying drawings.

In the following embodiments of the invention are explained in greater detail, by way of example only, making reference to the drawings in which:

FIG. 2 is a table of machine states, in accordance with an example of the present subject matter.

FIG. 3B depicts a diagram of a first and a second memory components of a process-based virtualization system in accordance with an example of the present subject matter.

FIG. 3C depicts a diagram of a first and a second memory components of a process-based virtualization system in accordance with an example of the present subject matter.

FIG. 6A depicts a data structure illustrating address translation trees being used for a process-based virtualization system in accordance with an example of the present subject matter.

FIG. 6B depicts a data structure illustrating address translation trees being used for a process-based virtualization system in accordance with an example of the present subject matter.

FIG. 6C depicts a diagram of data processing unit in accordance with an example of the present subject matter.

DETAILED DESCRIPTION

Figure 1A:
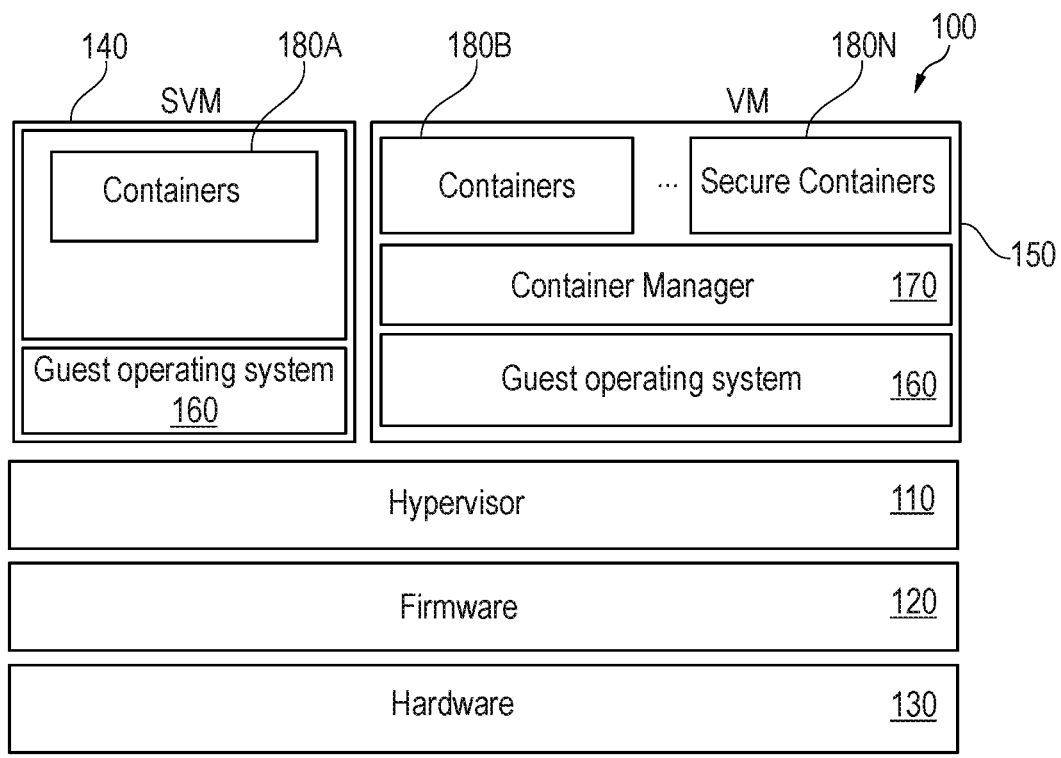
FIG. 1A is a block diagram of a process-based virtualization system in accordance with an example of the present subject matter.

Detailed embodiments of the present invention are disclosed herein with reference to the accompanying drawings. In the drawings, like numbering represents like elements. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The code underlying open-source operating systems is freely available for anyone to view and to modify. This may however expose computer systems, running such OS with typically millions of lines of code, to potential security vulnerabilities. In particular, processes that rely on the OS, such as instances of containers, may be exposed to security vulnerabilities as they are isolated through software concepts like namespaces and control groups (a.k.a., cgroups) only. The present subject matter may enable a computer system/firmware to execute processes of secure applications in a secure manner independently of the OS and using the hardware to isolate the secure applications from other applications. The secure application processes are treated differently from the non-secured application processes. For example, the address space is setup for a secure application, by the firmware instead of the OS. In addition, the firmware controls execution of the secure application instead of the OS. Untrusted applications may however run under control of the OS. This may particularly be advantageous as the number of secure applications is usually much smaller than the number of non-secure applications due to the effort needed for implementing secure applications. Thus, adapting the system for secure applications may secure access to data while still seamlessly integrating with existing systems. For example, the firmware may have a much smaller number of lines of codes compared to the OS as it only needs to do tasks that cannot be done by the OS with encrypted data of the secure applications.

The present subject matter may provide a transparent execution of processes for the users of the process-based virtualization system. That is, the user may not see a difference between execution of his/her secure and non-secure applications. A process may be the instance of a computer program that is being executed. A secure application process may be the instance of a secure application that is being executed. A non-secure application process may be the instance of a non-secure application that is being executed. A secure application and non-secure applications may be user defined e.g. the user may define an application as a secure or non-secure application.

The process-based virtualization system may for example be a container-based virtualization system. The process-based virtualization system may be a computer system. The process-based virtualization system may enable an operating-system-level virtualization. The OS-level virtualization may be enabled by a kernel of the process-based virtualization system which allows the existence of multiple isolated namespaces. A container may be one of such namespaces. A container may comprise an application with all the parts it needs, such as libraries and other dependencies. A container manager may be installed in the process-based virtualization system in order to manage (e.g. create, delete, start etc.) the containers. The container manager may for example be Docker or LXC. The OS-level virtualization may be a guest OS-level virtualization in case the container is running in a virtual machine (VM), which includes a guest OS, of the process-based virtualization system. In another example, the OS-level virtualization may be a host-OS-level virtualization in case the process-based virtualization system does not comprise virtual machines.

According to one embodiment, the firmware is configured for: receiving a system call (e.g. named 'scan' for clarity of the description) from a process, the system call indicating the secure application being stored in encrypted format in the first memory component (the first memory component stores an encrypted secure application), upon receiving the system call, configuring the data processing unit to operate in the second mode of operation, copying or moving the encrypted secure application in the second memory component and decrypting in the second memory component the copied or moved secure application, setting up an address translation structure for enabling access to data in the second memory component and the first memory component by the decrypted secure application, executing the decrypted secure application, the executing comprising accessing the second memory component using the address translation structure.

The process sending the scall may be a non-secure application process of a non-secure application. The system call scall of the non-secure application process may point to the secure application in the first memory component. For example, the system call scall of the non-secure application process may point to an integrity protected code part and a cryptographically protected code part of the secure application in the first memory component. The system call scall may be made from in-secure part because the code of the secure application loaded is cryptographically and integrity protected. The firmware may copy the integrity protected code part and a cryptographically protected code part to the second memory component. Decryption and integrity checking may be done in the second memory component. If those checks pass (or are successful), the code of the secure application may be executed as a secure process. In another example, the secure application may be part of a secure container, wherein the process sending the scall may be part of the secure container. For example, the system call scall may be sent by a library OS of the secure container. In a further example, the process sending the scall may be part of a secure VM, (SVM). The secure application process may directly point to the decrypted and integrity checked code in the second memory component.

According to one embodiment, the firmware is configured for: receiving a process initialization system call from a process, the call indicating that the secure application is stored in encrypted format in the first memory component, upon receiving the process initialization system call, configuring the data processing unit to operate in the second mode of operation, moving or copying the encrypted secure application into the second memory component, and thereafter decrypting the moved or copied secure application in the second memory component, setting up an address translation structure for enabling access to data in the second memory component and in the first memory component by the decrypted secure application. The address translation structure may be setup so that the decrypted secure application may be enabled to use library OS calls. The process that sends the initialization system call may be a non-secure application process of a non-secure application.

The execution of the secure application process may be enabled by an initialization phase and a secure application execution phase. This embodiment may enable the initialization phase. During the initialization phase, the firmware may setup the memory and/or interfaces that may be used by the secure application when executed. Separating the initialization phase from the secure application execution phase may enable to execute the secure application without changes of the code of the secure application. During the secure application execution phase, decryption of input data of the secure application and encryption of output data of the secure application may be done by library OS calls such that the input or output data may be read or stored in the first memory component. The data processing unit may be in a first secure state (as described herein) in the initialization phase and may be in a second secure state in the secure application execution phase.

According to one embodiment, the address translation structure comprises a partition table and a secure process table for secure processes, the partition table and secure process table being stored in the second memory component, wherein setting up the address translation structure comprises adding a partition entry in the partition table, the added partition entry pointing to the secure process table, and adding a process entry in the secure process table associated with a secure application process of the secure application, the added process entry pointing to a secure application address translation tree, the secure application address translation tree being configured for enabling translation of effective addresses to physical addresses of the second memory component.

Figure 6D:
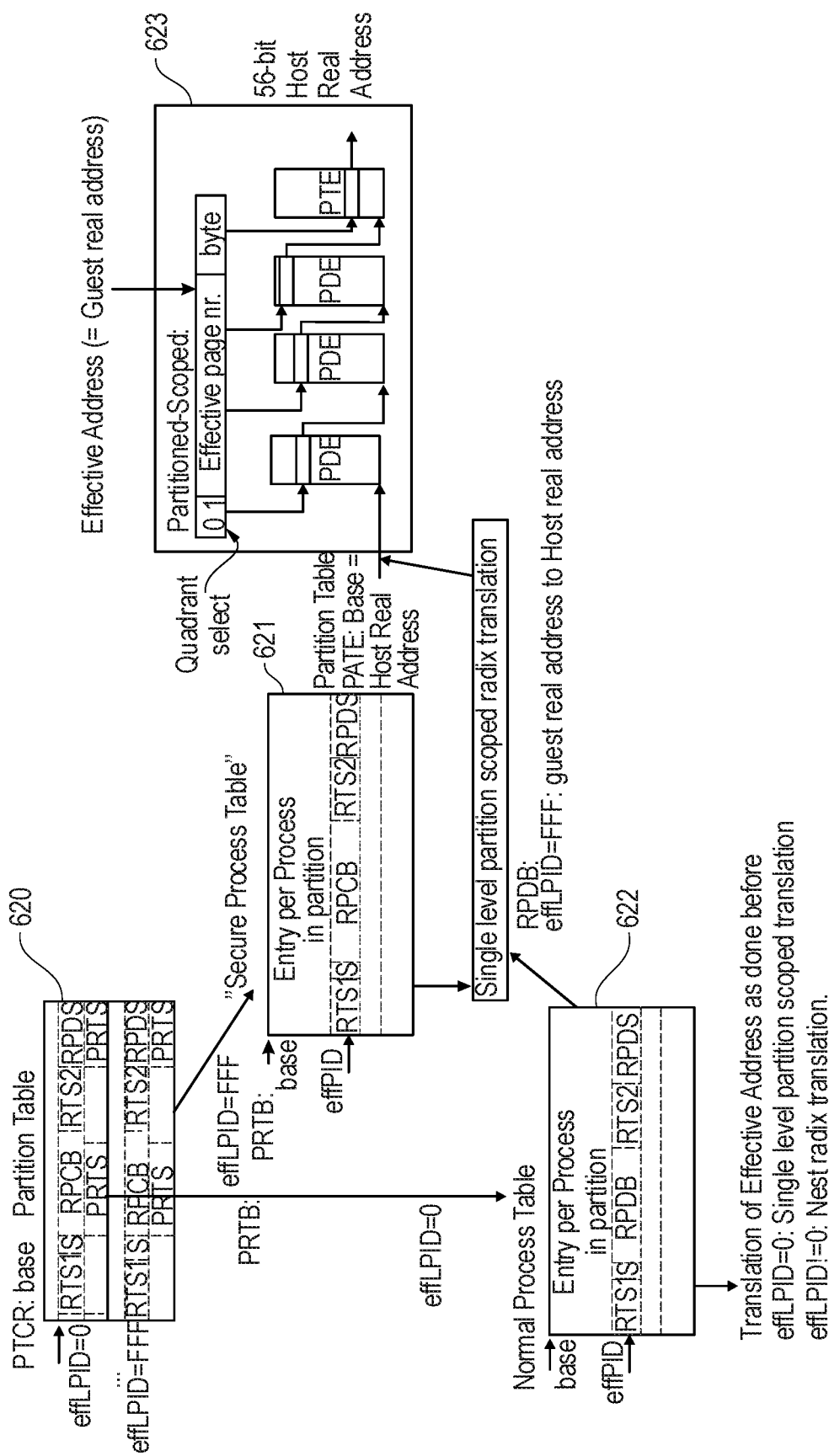
FIG. 6D depicts a flow diagram illustrating an address translation process in accordance with an example of the present subject matter.

The secure application translation tree may be a single level partition scoped radix translation tree, an example of which is numbered 624 in FIG. 6D. The added process entry may enable to locate page directories and page tables of the secure application address translation tree.

According to one embodiment, the firmware is configured for: further receiving an address indicative of a storage location of the encrypted secure application in the first memory component using the address for performing the decryption and the copy.

Moving the instructions of the secure application from the first memory component to the second memory component may prevent access e.g. by the OS and non-secure applications, to the instructions in the second memory component. This may also be advantageous as it may enable a seamless integration of the present subject matter with existing systems e.g. the secure application starts in the first memory component as any other application.

The received address may, for example, be part of the received process initialization system call or the received system call (scall).

According to one embodiment, the unencrypted secure application is associated with a hash value indicative of the content of the secure application, the firmware being further configured for performing an integrity check of the unencrypted content of the secure application using the hash value. The decryption and copy is performed if the integrity check is successful. The integrity check may comprise determining whether the hash value is still representative of the current content of the secure application. If it is representative of the current content of the secure application the decryption and copy may be performed. In an alternative embodiment, the integrity check is done concurrently with the decryption. The decryption succeeds if the integrity check passes and fails otherwise.

This embodiment may further increase the secure aspect of the present subject matter as it may prevent access to the code of the secure application even before starting execution of the secure application. This may for example prevent a malicious modification of the secure application before being executed by the firmware.

According to one embodiment, the data processing unit comprises a partition table, the partition table being indexed by logical process identifiers (LPID), the partition table comprising entries pointing to the secure process table, wherein said entries are indexed by a fixed value, the secure process table being indexed by secure process identifiers (SPID), the data processing unit further comprising a secure register comprising a value of the SPID of the secure application process, the secure application process being configured to use the fixed value to identify the secure process table and to use/read a value stored in the secure register for performing an address translation using an entry of the secure process table that is associated with the read value of the secure register. The read value is the SPID value stored in the secure register.

The fixed value may be a reserved effective LPID, effLPID='FFF'x.

The secure process table is a table maintained by the firmware and describes the processes in the memory. Indexing the secure process table by SPIDs of secure processes may further enhance the secure aspect of the present subject matter because the secure processes may be assigned IDs that can only be accessed by the firmware and the secure application process itself. For example, the SPID is used to find a memory table associated with the secure application process. This memory table is in secure memory (the second memory component) and is only accessible by the firmware (and the address translation hardware). The locations in the memory table are accessible by the secure application process and the firmware. The hardware is allowed to utilize this memory table if the secure application process is running in secure mode (the second mode of operation).

According to one embodiment, after the setting up of the translation structure, the firmware is further configured for: receiving an application start system call from the process, the application start system call comprising an address, upon receiving the application start system call, executing the decrypted secure application, the executing comprising accessing the second memory component using the address translation structure. This embodiment may enable the secure application execution phase. The process that sends the application start system call may be the non-secure application process.

According to one embodiment, the data processing unit has at least two secure states in the second mode of operation, a first secure state of the two secure states being a firmware state in which the data processing unit enables execution of the firmware, and a second secure state of the two secure states being a secure application process state in which the data processing unit enables execution of the secure application process.

According to one embodiment, the data processing unit is configured to switch to the first secure state upon receiving a process initialization system call or an interrupt request and to switch to the second secure state upon receiving an application start system call.

In case of a received (single) system call scall, the data processing unit is configured to move or copy the secure application into secure memory (the second memory component) upon receiving the system call (scall) or configured for receiving an interrupt request and to allow the process to start or resume execution in the second secure state, upon setting up the translation structure. If the cryptography or integrity of the secure application checks fail, the secure process may not be started to execute.

According to one embodiment, the data processing unit comprises a machine state register (MSR), the MSR comprising a secure bit, the secure bit is set to a first value to indicate to the data processing unit to operate in the first mode of operation, and wherein the secure bit is set to a second value to indicate to the data processing unit to operate in the second mode of operation. For example, when the data processing unit operates in the first mode of operation, data written to the computer readable storage media is written to the first memory component, and when the data processing unit operates in the second mode of operation, the computer readable storage media is configured to enable access data to the first memory component and the second memory component.

According to one embodiment, the secure application process is a runnable instance of a container comprising the secure application.

According to one embodiment, the container is running in a virtual machine of the process-based virtualization system.

FIG. 1A is a block diagram of a process-based virtualization system 100, in accordance with an example of the present subject matter. Process-based virtualization system 100 includes host operating system (hypervisor) 110, firmware 120, hardware 130, secure virtual machine (SVM) 140, and VM 150. The hardware 130 may for example comprise a data processing unit (e.g. processor core) in accordance with an example of the present subject matter. Components of process-based virtualization system 100 may be interconnected via a network (not depicted) for example, a local area network (LAN), a wide area network (WAN) such as the Internet, or a combination of the two, and include wired, wireless, or fiber optic connections. Process-based virtualization system 100 may be a desktop computer, laptop computer, specialized computer server, or any other computer system known in the art. In certain embodiments, process-based virtualization system 100 may represent computer systems utilizing clustered computers and components to act as a single pool of seamless resources when accessed through a network. For example, such embodiments may be used in a data center, cloud computing, storage area network (SAN), wide area network (WAN), and network attached storage (NAS) applications. In general, the computing systems described herein are representative of an electronic device, or combination of electronic devices, capable of executing machine-readable program instructions, in accordance with an example of the present subject matter.

Hypervisor 110 represents a system software, such as a virtual machine monitor (VMM) configured to manage, create, and execute SVM 140 and VM 150. Hypervisor 110 may be an untrusted system software component. The hypervisor 110 may be configured to access and manage a first memory component of a computer readable storage media of the system 100.

Firmware 120 represents a trusted system software component configured to provide control, monitor and manipulate data executed by hardware 130, which is trusted. In this embodiment, firmware 120 manages a second memory component of the computer readable storage media of the system 100. Furthermore, each SVM 140 and secure container (or secure application) may be assigned to the second memory component. Firmware 120 operates in ultravisor mode, which is a privilege level above hypervisor 110 mode. The ultravisor may refer to the firmware. In the ultravisor mode, firmware 120 is configured to control the regular partition scoped address translation mechanism, along with hardware 130 for maintaining separation between the first and second memory components. Additionally, firmware 120 is configured to maintain separation of each SVM 140 and secure container within the second memory components (FIGS. 3B and 3C show example content of the first and second memory components). For example, the second memory component is configured for access by the firmware and the secure application. The second memory component is configured so that the second memory component is not accessed by the OS and the non-secure applications.

Hardware 130 mechanisms may be used to invoke firmware 120 whenever a transition between the two memory components occurs, thus enabling firmware 120 to assure that the state of a process in one memory component is properly isolated from the state of a process in the other memory component.

Subsystems of process-based virtualization system 100 (not depicted) may interact with process-based virtualization system 100 memory independently of hardware 130 components, such as a processor. These subsystems may be modified such that all untrusted devices (e.g., Input/Output (I/O) devices) cannot access the second memory component. Subsystem data which is secure, and to be used by a secure application, may be stored in encrypted format in the first memory component. Furthermore, firmware 120 operating in ultravisor mode may move or copy the encrypted data into the second memory component and decrypt it. In another example, the hardware may do the encryption/decryption under the direction of firmware 120. Secure data in the second memory component may be encrypted and may have a secure hash added before being stored in hypervisor 110/VM 150 memory domain i.e. the first memory component. The encrypted data can thereafter be paged out by hypervisor 110 to disk storage. Accordingly, data and state information related to SVM 140 and secure containers may not be in a clear text format outside the second memory component and is integrity protected by the secure hash.

Hardware 130 represents hardware components for system 100. In this embodiment, an SMF-enabled processor (e.g. the data processing unit may be the SMF-enabled processor) is included in hardware 130 and has a set of asymmetric keys and may have associated symmetric keys that are used for protecting the secure data handled by SVM 140 and/or by the secure application.

SVM 140 is similar to VM 150. In addition, SVM 140 as well as the secure application may be packaged for SMF with secure data which is encrypted with a public SMF key of a target processor. A private SMF key may be protected by a Trusted Platform Module (TPM) and may become available only when the correct firmware 120 is loaded during boot. In this embodiment, a trusted entity that manufactures and distributes the SMF-enabled processors may issue certificates for their public keys.

The SVM may enable a secure execution of applications running inside the SVM. For that, the SVM trusts a given OS (e.g., guest OS 160) but not the hypervisor. However, applications running inside normal VMs may need to be secured if OS is not trusted. That is, the secure application does not trust both the OS and the hypervisor 110, if present. The present subject matter may enable to secure such applications. Each of the VMs and SVMs of the process-based virtualization system 100 may, for example, enable containers, wherein the containers may be secure containers and/or unsecure containers. Secure containers represent secure applications such as banking operations. For example, the VM 150 comprises a container manager 170 executed at least in part by a guest operating system 160 for developing, delivering, installing and executing containers 180A-N, which herein denotes the combination of containers 180A and secure containers 180N. Notes that there is also another set of containers, herein denoted containers 180B, that includes a copy of the application and library operating system that is included in Containers 180A. In contrast, secure containers 180N includes a secure version of the application and a secure library operation system. As used herein the secure version of the application and a secure library operation system of secure containers 180N have a higher level of security when compared to the versions of the application and library operation system found in containers 180A and containers 180B. The container manager 170 may for example be Docker or LXC. A container of the containers 180A-N may be created using the container manager 170. A container may for example comprise an application and required libraries. The secure containers 180N may comprise a secure application that can perform secure library calls for accessing data in the first and second memory components.

The container manager 170 may for example be configured to receive a container image for instantiation, installation and/or execution in the guest operating system 160. For example, the container image may be a Docker image obtained from a container repository such as the Docker registry. For example, the container image may be a read-only template with instructions for creating a container. Using the container image, a container 180A-N may be instantiated by the container manger 170 for execution as one or more processes in the guest operating system 160.

The process-based virtualization system 100 enables virtualizations using containers running within VMs.

Figure 1B:
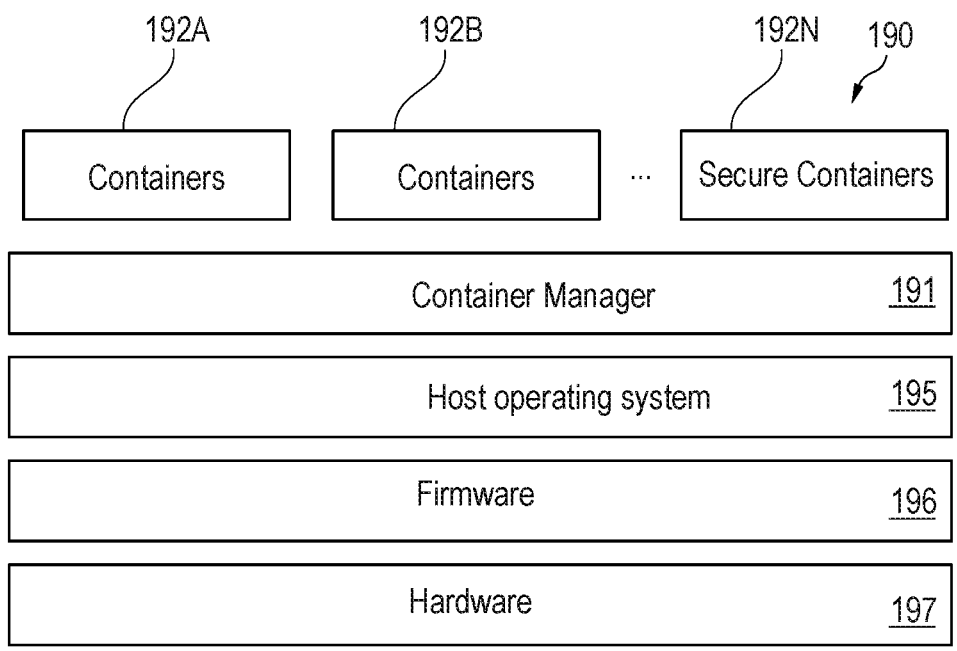
FIG. 1B is a block diagram of a process-based virtualization system in accordance with an example of the present subject matter.

FIG. 1B is a block diagram of a process-based virtualization system 190, in accordance with an example of the present subject matter.

The process-based virtualization system 190 comprises host operating system (OS) 195, firmware 196 and hardware 197 as described with reference to FIG. 1A. The hardware 197 may for example comprise a data processing unit (e.g. processor core) in accordance with an example of the present subject matter.

The process-based virtualization system 190 provides virtualization using containers only e.g. without using VMs (i.e. no hypervisor).

The process-based virtualization system 190 may enable containers. The containers may be secure containers and/or unsecure containers. For example, the process-based virtualization system 190 comprises a container manager 191 executed at least in part by a host operating system (OS) 195 for developing, delivering, installing and executing containers 192A-N. It is understood that, similar to containers 180A and 180B, containers 192A and 192B include copies of an application and a library operating system. Further, similar to secure containers 180N, secure containers 192N include a more secure version of application and library operating system. The container manager 191 may for example be Docker or LXC. A container of the containers 192A-N may be created using the container manager 191.

FIG. 2 is a table of bits from the MSR that indicate machine states of a data processing unit, in accordance with an example of the present subject matter. Different machine states are provided for the first and second mode of operations. In this example, a typical first mode of operation 210 is extended with a second mode of operation using MSR (S) bit 220, which is for example, a secure bit.

In the first mode of operation 210, the data processing unit may have four different machine states 251-254. Each of the four machines states 251-254 enables access to data and resources of the data processing unit for a corresponding component such as the hypervisor 110, and non-secure applications. For example, untrusted applications and hypervisor 110 may be operated if MSR (S) bit 220 is set to 0. The state 252 is associated with the hypervisor 110 in case the data processing unit is part of process-based virtualization system 100 and associated with the host OS 195 in case the data processing unit is part of process-based virtualization system 190. The state 252 is referred to herein as a hypervisor state for simplification of the description.

The second mode of operation 210 may be active if MSR (S) bit 220 is set to 1. For example, MSR (S) bit 220 is set to 1 for secure applications. In the second mode of operation, the data processing unit may have machine states 241-244. At least two states 241-242 may be used for enabling the execution of the secure applications. To enable that the executed secure application (e.g. in VM 150) may operate unchanged, the two states are supported with the MSR (S) bit 220 equal to 1.

Each machine state of the machine states 241-244 and 251-254 may be defined by a respective combination of values of a set of bits of the MSR. The set of bits may for example be maintained/set by the firmware. The set of bits includes the secure bit. The set of bits may further comprise the MSR (HV) and MSR (PR) bits. In the second mode of operation, a firmware state (or ultravisor state) is defined by setting MSR (S) bit 220, MSR (HV) bit 230, and MSR (PR) bit 240 to 1, 1 and 0, respectively. In order to execute the secure application, the MSR (PR) bit may be flipped so that the data processing unit is in the state 0b111. Accordingly, without a code change of the code of the secure applications the firmware may maintain control, instead of hypervisor 110 (or host OS 195) when otherwise the hypervisor state 252 would be entered. This enables saving and clearing secure data and state information before the firmware gives control over to hypervisor 110 (or to host OS 195). The transition of state from the firmware state to the hypervisor state may be performed by resetting MSR (S) bit 220 to 0 by the firmware return from interrupt double word instruction. This provides an example implementation and alternative equivalent mechanisms can be implemented by those skilled in the art.

The data processing unit may be configured to switch or transition between the states 241-244 and 251-254 for enabling access to data by the component that is associated with the state to which it switched. For example, in state 241 (MSR(S, HV, PR)=0b111, the secure application may be executed and may be enabled to access the data stored in the secure memory. The hardware 130 may be configured such that only the firmware can set the MSR(S) bit. In order for the firmware, 120, to control the transition between secure and non-secure states and to assure the security of SVMs or secure processes/containers it controls the MSR(S) bit, or receives control whenever the state is changed automatically by hardware.

Figure 3A:
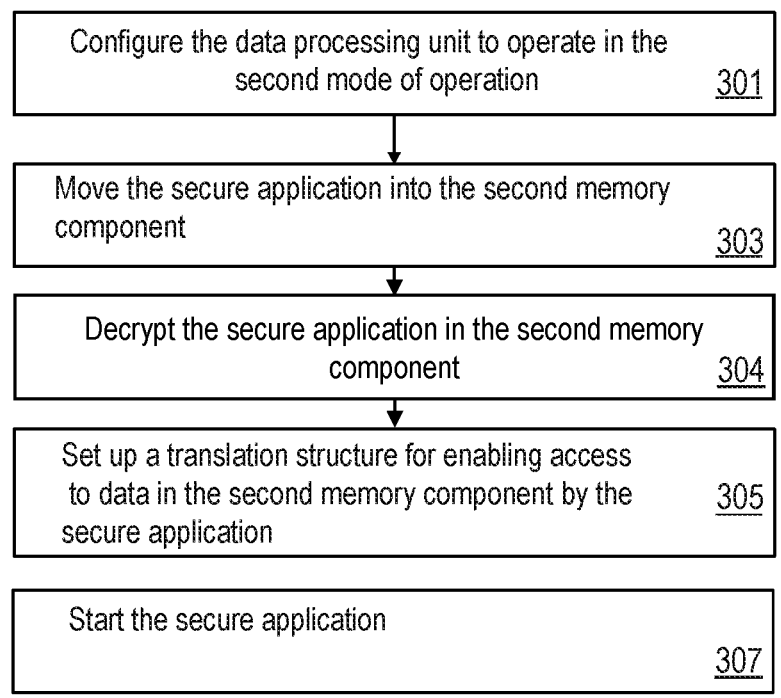
FIG. 3A is a flowchart of a method for executing a secure application in accordance with an example of the present subject matter.

FIG. 3A is a flowchart of a method for enabling execution of a secure application. The secure application may for example be part of a secure containers 180N. The execution of the secure application process may be implemented in the system of FIG. 1A or FIG. 1B, but it is not limited to that implementation.

The data processing unit may be configured in step 301 to operate in the second mode of operation e.g. by setting the secure bit to 1. Step 301 may for example be performed upon receiving by the firmware 120 a process initialization system call or another system call (e.g. named scall) from a given process. The given process may be a process of a non-secure application. The firmware 120 may for example set the secure bit MSR(S) so that the data processing unit may operate in the second mode of operation.

The received process initialization system call (or the received scall) may point to an encrypted file containing the secure application of the secure containers 180N in encrypted format in the first memory component. FIGS. 3B and 3C show an example content of the first and second memory components for the process-based virtualization system 100 and 190 respectively. A first memory component (herein called normal memory 310A) of process-based virtualization system 100 comprises an encrypted secure application and a secure library operating system 302, a VM 150, which may include a docker engine, a guest OS 160, and secure containers in encrypted format. The first memory component 310B of process-based virtualization system 190 comprises a container manager 191, a host OS 195, and a secure container using an encrypted format that includes an encrypted and secured application and library operating system 302.

In step 303, the firmware 120 moves the encrypted secure application into the second memory component. In step 304 the firmware 120 may decrypt the secure application. In one example, the firmware may perform an integrity check of the decrypted secure application. The integrity check may be performed using a hash associated with the unencrypted content of the secure application e.g. to make sure that nothing has been changed in the code (e.g. a bit is flipped). If the integrity check fails, the transition to secure process/container fails and the second memory component is cleared prior to returning. In this case steps 305-307 are not executed. As shown in FIG. 3B, the second memory component 312A, which is a secure memory of process-based virtualization system 100, comprises translation: radix tree 309, firmware 120 in which effLPID=FFF, and secure container 308 that includes a secure application and a secure library OS in unencrypted format. The second memory component 312A may further comprise the SVM 140 in unencrypted format. As shown in FIG. 3B, the second memory component, herein called secure memory 312B, of process-based virtualization system 190 comprises translation: radix tree 309, firmware 196, and secure container 308, which includes secure containers in unencrypted format.

In step 305, the firmware 120 sets up a translation structure in the second memory component for enabling access to data in the second memory component by the secure application. The translation structure may comprise a partition table and process tables as shown in FIG. 6D. The setup may be performed by creating a new entry in the partition table that points to a secure process table. An entry may also be added to the secure process table that associates the secure application to a translation tree e.g. a secure process scoped radix tree, such as translation: radix tree 3099 of FIGS. 3B and 3C. That is, the firmware 120 owns the partition table and sets up for address translation using the translation tree. For example, the second memory component 312A and 312B of process-based virtualization system 100 and 190 may store the secure application address translation tree.

In one example, the method of FIG. 3A may further comprise a step 307 of starting the secure application. In one example, the start of the secure application may be performed in response to receiving an application start system call after the reception of the process initialization system call. That is, steps 301 to 305 may be performed in response to the received process initialization system call and step 307 may be performed in response to the received application start system call. In another example, steps 301 to 307 may be performed in response to the received other system call (scall).

Figure 4:
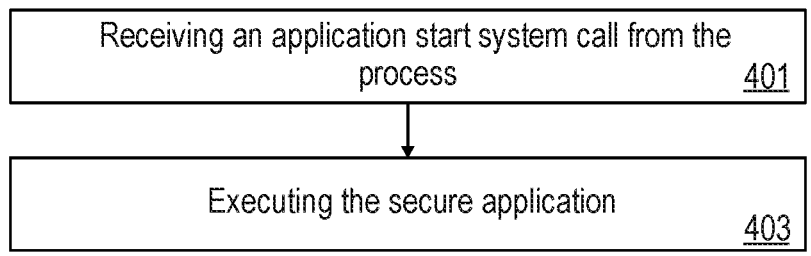
FIG. 4 is a flowchart of a method for executing a secure application in accordance with an example of the present subject matter.

FIG. 4 is a flowchart of a method for executing a secure application. The secure application may for example be part of a container e.g. a container included in secure containers 180N.

In step 401, the firmware 120 may receive an application start system call from the process e.g. of the non-secure application. The application start system call comprises an address indicating the secure application address translation tree.

Upon receiving the application start system call, the firmware 120 may execute in step 403 the secure application. The execution of the secure application comprises accessing the second memory component using the secure application address translation tree.

Figure 5:
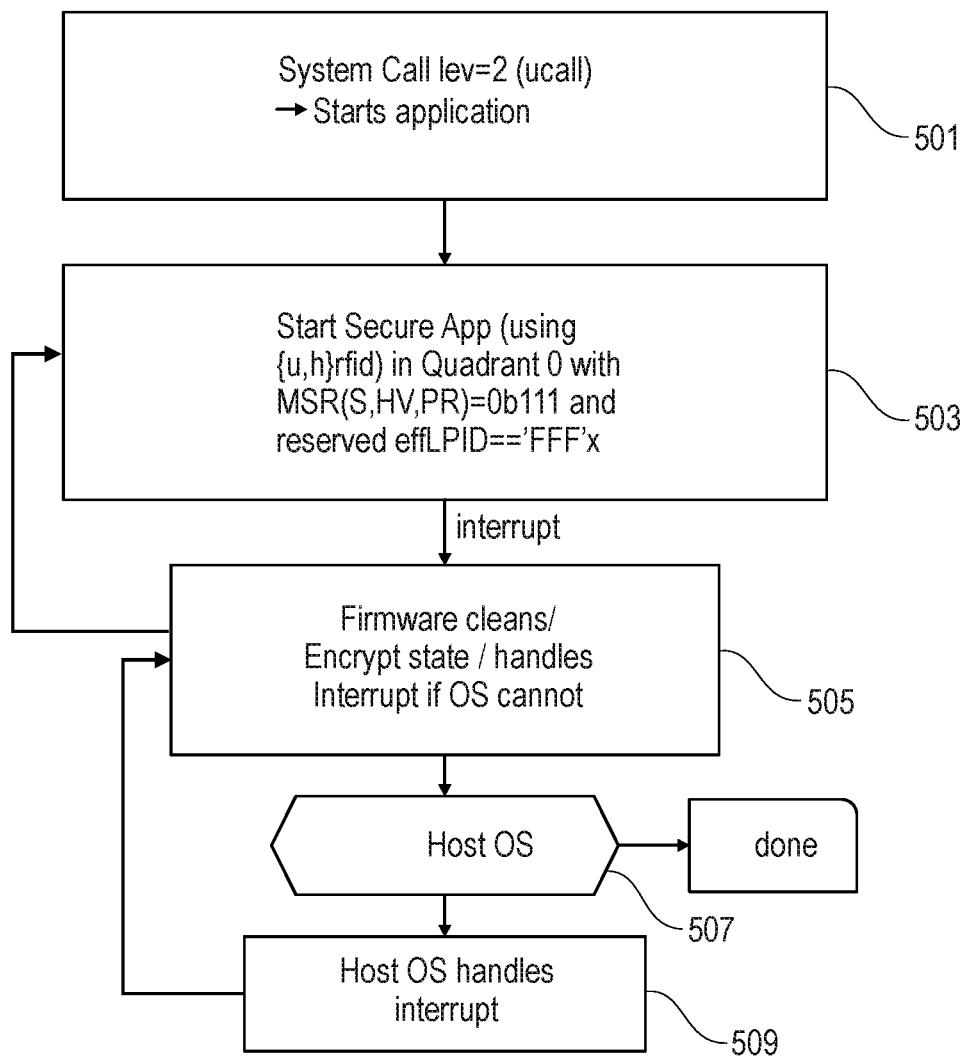
FIG. 5 is a flowchart of a method for executing a secure application in accordance with an example of the present subject matter.

FIG. 5 is a flowchart of a method for executing a secure container e.g. e.g. a container included in secure containers 180N.

In step 501, a system call (e.g. ucall) having level lev=2 may be received. The system call is received for starting the secure application of the secure container. The system call may be received while the data processing unit is in the firmware state 0b110.

In step 503, the secure application may start (e.g. using urfid or hrfid instruction). The execution of the secure application may be performed in the state MSR(S, HV, PR)=0b111.

Interrupts caused or triggered by the secure application may be handled as described with reference to steps 505 to 509. For example, if the secure application needs an OS enabled operation e.g. for reading data from disk, the data processing unit may switch to the state 242 ((MSR(S, HV, PR)=0b110) in step 505. In the state 242, the firmware may manage the OS operation on behalf of the secure application. In order to keep the number of lines of the code of the firmware limited, the firmware may use the OS in order to perform the requested operation of the secure application. The firmware may switch the data processing unit to a given state that allows the OS to perform the operation in steps 507-509. The given state is state 254 in case the secure application is part of the process-based virtualization system 100 of FIG. 1A, and state 252 in case the secure application is part of the process-based virtualization system 190 of FIG. 1B. The requested data of the operation may be encrypted before being stored in the first memory component e.g. data may be provided or (pre)stored in encrypted format in the disk so that they may be requested by the secure application. After the operation is done, the data processing unit switches to the firmware state 242 again. When the OS completes the operation, if it chooses to resume the secure application it returns to the firmware 120 which will restore the secure state 0b111 (241) and pass control to the secure application. The firmware may for example pre-process requested data or result of the operation before switching to the state 241 so that the secure application continues execution using the pre-processed data. The pre-processing may for example comprise encryption of output data of the secure application or decryption of input data of the secure application. Interrupts which are not associated with the secure application and received while the secure application being executed may be securely reflected to the OS.

In one example, the data processing unit may switch from state 241 0b111 to state 242 0b110 in step 505. The data processing unit may switch from state 242 0b110 to hypervisor state in steps 507 and 509 to enable the host OS to handle the interrupt.

FIGS. 6A to 6D depict data components that enable access to data stored in the second memory component in accordance with an example of the present subject matter. FIGS. 6A and 6B show data structures 601 and 610 illustrating the different states of the data processing unit for different received effective addresses. The data structures 601 and 610 indicate which translation tree can be used for a given received effective address (EA) for the process-based virtualization systems 100 and 190 respectively.

The data structures 601 and 610 may be described as tables having cells, wherein each cell is defined by a pair of distinct values of two variables V1 and V2. The variable V1 refers to the values of the two first bits of the effective address as indicated by the first column of the data structures and the variable V2 refers to the values of the MSR(S, HV, PR) bits. The present subject matter makes use of the two first bits of the effective address for defining the states of the data processing unit associated with each distinct value of V1.

Each cell of the data structures indicates two registers that comprise values of two identifiers. The two identifiers are process identifiers and logical partition identifiers (or VM identifier). If for example, the received address is in quadrant 0 (i.e. EA(0:1)=00) and MSR(S, HV, PR)=0b111, the corresponding cell indicates registers named (e.g. SPIDR) from which the identifiers of the process (that sent the given address) and of the logical partition in which the process is running. The address translation mechanism uses the content of the indicated registers and the partition table as shown in FIG. 6D to translate the given address (if the process is running in the correct mode).

The values of the MSR(S, HV, PR) bits may be read from the MSR register which is part of the data processing unit 615 shown in FIG. 6C. The MSR register may for example be part of an instruction sequencing unit (ISU) 616 of the data processing unit 615. In addition, the registers indicated in the cells of the data structures such as SPIDR may for example be part of the load store unit (LSU)/memory management unit (MMU) 617 of the data processing unit as shown in FIG. 6C.

As indicated in FIG. 6D, the values of the two registers in each cell of the data structures 601 in FIG. 6A and 610 of FIG. 6B may be used as indices of the partition table controlled by the firmware so that the translation can be performed. For example, for a secure container, the two indices may enable to translate the given address using the partition scoped tree as shown in FIG. 6D.

As shown in FIG. 6D, the partition table 620 comprises an entry per logical partition ID. Each entry of the partition table 620 refers to a corresponding process table. For example, the entry indexed by a logical partition ID equal to FFF may point to a secure process table 621 as shown in FIG. 6D. And, the entry indexed by a logical partition ID equal to 0 may point to a normal process table 622 as shown in FIG. 6D. The secure process table 621 comprises an entry per secure process and being indexed by secure process IDs. Each entry of the secure process table 621 points to the location of the page directories and page tables of a translation tree 623. The translation tree 623 may be a partition scoped translation tree as shown in FIG. 6D. The translation tree 623 may be used to translate the received effective address as indicated in FIG. 6D. For example, the origin of a highest order translation table of hierarchical translation tables of the translation tree 623, is provided, for example, by the entry of the secure process table associated with the secure application process. The effective address is used to index into each table of the hierarchical translation tables to determine an origin address of the next table to locate, for example, a page table entry (PTE) having an address of a page of physical memory.

Some embodiments provide one or more of method, a computer system, and computer program product for process-based virtualization. At least one such embodiment includes granting an operating system, a secure application, a non-secure application, and a firmware of a process-based virtualization system access to a first memory component of a computer readable storage media, wherein the firmware and the secure application are permitted access to a second memory component of the computer readable storage media and the operating system and the non-secure application are prohibited from accessing the second memory component The embodiment includes modifying the data processing unit to operate in a first mode of operation such that the data processing unit executes the non-secure application using the operating system. The embodiment includes modifying the data processing unit to operate in a second mode of operation such that the data processing unit executes the secure application using the firmware and application code of the secure application is executed using the second memory component.

At least one such embodiment includes receiving a system call from a process, wherein the system call indicates that the secure application is being stored in an encrypted format in the first memory component. At least one such embodiment includes responding to reception of the system call by modifying the data processing unit to operate in the second mode of operation. At least one such embodiment includes copying the encrypted secure application in the second memory component. At least one such embodiment includes decrypting the secure application in the second memory component. At least one such embodiment includes generating an address translation structure that provides access to data in the second memory component and the first memory component by the decrypted secure application. At least one such embodiment includes executing the decrypted secure application such that the second memory component is accessed using the address translation structure.

At least one such embodiment includes firmware that includes program instruction to perform a method. The method includes receiving a process initialization system call from a process indicating that the secure application is being stored in encrypted format in the first memory component. The method includes responding to reception of the process initialization system call. The method includes configuring the data processing unit to operate in the second mode of operation. The method includes copying the encrypted secure application in the second memory component. The method includes decrypting the secure application in the second memory component. The method includes generating an address translation structure that grants the decrypted secure application access to data in the second memory component and the first memory component.

In at least one embodiment, the address translation structure includes a partition table and a secure process table. In at least one embodiment, the partition table and secure process table are stored in the second memory component. In at least one embodiment, generating the address translation structure includes adding, to the partition table, (i) a partition entry that points to the secure process table, and (ii) a process entry that is associated with a secure application process of the secure application, wherein the process entry points to a secure application address translation tree that enables translation of effective addresses to physical addresses.

At least one embodiment includes firmware that includes program instruction to perform a method. The method includes receiving an address that indicates a storage location of the secure application in the first memory component. The method includes using the address to copy the encrypted secure application and decrypt the secure application.

In at least one embodiment, the encrypted secure application is associated with a hash value that is associated with the content of the encrypted secure application. In at least one embodiment, the method, which may be executed via firmware, includes performing an integrity check of the encrypted secure application using the hash value.

In at least one embodiment, the address translation structure includes a partition table and a secure process table, wherein the partition table is indexed by logical process identifiers. In at least one embodiment, the partition table includes entries pointing to the secure process table, wherein entries that point to the secure process table are indexed by a fixed value. In at least one embodiment, the secure process table is indexed by secure process identifiers. In at least one embodiment, the data processing unit includes a secure register comprising a value of a secure process identifier of a secure application process of the secure application. In at least one embodiment, the secure application process uses the fixed value to identify the secure process table and uses a value stored in the secure register for performing an address translation using an entry of the secure process table that is associated with the value of the secure register.

At least one embodiment includes firmware that includes program instruction to perform a method. The method includes determining that the translation structure has been created. The method includes receiving an application start system call from the process. The method includes, upon receiving the application start system call, executing the decrypted secure application by accessing the second memory component using the address translation structure.

In at least one embodiment, the data processing unit includes at least a first secure state and a second secure state in the second mode of operation. In at least one embodiment, the first secure state includes a firmware state in which the data processing unit enables execution of the firmware, and the second secure state includes a secure application process state in which in which the data processing unit enables execution of the secure application.

In at least one embodiment, the method includes switching to the first secure state in response to receiving a process initialization system call or an interrupt request. In at least one embodiment, the method includes switching to the second secure state in response to receiving an application start system call.

In at least one embodiment, the data processing unit includes a set of bits whose values indicate of the first and second secure states.

In at least one embodiment, the data processing unit includes a machine state register in which the set of bits include an machine state register bit that indicates a mode of operation for the data processing unit, a machine state register bit that indicates a hypervisor state, and a machine state register bit that indicates a privileged state or a problem state of the machine state register.

In at least one embodiment, the data processing unit includes a machine state register that includes a secure bit, wherein the secure bit being set to a first value causes to the data processing unit to operate in the first mode of operation, and wherein the secure bit being set to a second value causes to the data processing unit to operate in the second mode of operation. In at least one embodiment, in the first mode of operation, the data processing unit writes data that is written to the computer readable storage media to the first memory component. In at least one embodiment, in the second mode of operation, the computer readable storage media is modified to access data included in the first memory component and the second memory component.

In at least one embodiment, a secure application process of the secure application is a runnable instance of a container comprising the secure application. In at least one embodiment, the container is executing within a virtual machine of the process-based virtualization system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for process-based virtualization, the computer system comprising:
   one or more computer processors;
   at least one computer readable storage medium that is not a transitory signal per se; and
   program instructions stored on the at least one computer readable storage medium, the program instructions being executable by at least one computer processor of the one or more computer processors to cause the at least one computer processor to perform a method comprising:
      granting an operating system, a secure application, a non-secure application, and a firmware of a process-based virtualization system access to a first memory component of a computer readable storage media, wherein the firmware and the secure application are permitted access to a second memory component of the computer readable storage media and the operating system and the non-secure application are prohibited from accessing the second memory component;
      modifying the data processing unit to operate in a first mode of operation such that the data processing unit executes the non-secure application using the operating system; and
      modifying the data processing unit to operate in a second mode of operation such that the data processing unit executes the secure application using the firmware and application code of the secure application is executed using the second memory component.

2. The system of claim 1, wherein the firmware includes:
   program instruction to receive a system call from a process, wherein the system call indicates that the secure application is being stored in an encrypted format in the first memory component;
   program instruction to respond to reception of the system call by modifying the data processing unit to operate in the second mode of operation;
   program instruction to copy the encrypted secure application in the second memory component;
   program instruction to decrypt the secure application in the second memory component;
   program instruction to generate an address translation structure that provides access to data in the second memory component and the first memory component by the decrypted secure application; and program instruction to execute the decrypted secure application such that the second memory component is accessed using the address translation structure.

3. The system of claim 1, wherein the firmware includes:

program instruction to receive a process initialization system call from a process indicating the secure application being stored in encrypted format in the first memory component;

program instruction to respond to reception of the process initialization system call, configuring the data processing unit to operate in the second mode of operation;

program instruction to copy the encrypted secure application in the second memory component and decrypting the secure application in the second memory component; and program instruction to generate an address translation structure that grants the decrypted secure application access to data in the second memory component and the first memory component.

4. The system of claim 2, wherein the address translation structure includes a partition table and a secure process table, wherein the partition table and secure process table are stored in the second memory component, and wherein generating the address translation structure includes adding, to the partition table, (i) a partition entry that points to the secure process table, and (ii) a process entry that is associated with a secure application process of the secure application, wherein the process entry points to a secure application address translation tree that enables translation of effective addresses to physical addresses.

5. The system of claim 2, the firmware including:

program instructions to receive an address that indicates a storage location of the secure application in the first memory component; and program instruction to use the address to copy the encrypted secure application and decrypt the secure application.

6. The system of claim 2, wherein the encrypted secure application is associated with a hash value that is associated with the content of the encrypted secure application, and wherein the firmware includes program instructions to for perform an integrity check of the encrypted secure application using the hash value.

7. The system of claim 2, wherein the address translation structure includes a partition table and a secure process table, wherein the partition table is indexed by logical process identifiers, wherein the partition table includes entries pointing to the secure process table, wherein entries that point to the secure process table are indexed by a fixed value, wherein the secure process table is indexed by secure process identifiers, wherein the data processing unit includes a secure register comprising a value of a secure process identifier of a secure application process of the secure application, wherein the secure application process uses the fixed value to identify the secure process table and uses a value stored in the secure register for performing an address translation using an entry of the secure process table that is associated with the value of the secure register.

8. The system of claim 3, the firmware including:

program instructions to determine that the translation structure has been created;

program instructions to receive an application start system call from the process; and program instructions to, upon receiving the application start system call, execute the decrypted secure application by accessing the second memory component using the address translation structure.

9. The system of claim 1, wherein the data processing unit includes at least a first secure state and a second secure state in the second mode of operation, wherein the first secure state includes a firmware state in which the data processing unit enables execution of the firmware, and the second secure state includes a secure application process state in which in which the data processing unit enables execution of the secure application.

10. The system of claim 9, the data processing unit including:

program instructions to switch to the first secure state in response to receiving a process initialization system call or an interrupt request, and to switch to the second secure state in response to receiving an application start system call.

11. The system of claim 9, wherein the data processing unit includes a set of bits whose values indicate of the first and second secure states.

12. The system of claim 11, wherein the data processing unit includes a machine state register in which the set of bits include an machine state register bit that indicates a mode of operation for the data processing unit, a machine state register bit that indicates a hypervisor state, and a machine state register bit that indicates a privileged state or a problem state of the machine state register.

13. The system of claim 1, wherein:

(i) the data processing unit includes a machine state register that includes a secure bit, wherein the secure bit being set to a first value causes to the data processing unit to operate in the first mode of operation, and wherein the secure bit being set to a second value causes to the data processing unit to operate in the second mode of operation;

(ii) in the first mode of operation, the data processing unit writes data that is written to the computer readable storage media to the first memory component; and (iii) in the second mode of operation, the computer readable storage media is modified to access data included in the first memory component and the second memory component.

14. The system of claim 2, wherein a secure application process of the secure application is a runnable instance of a container comprising the secure application.

15. The system of claim 14, wherein the container is executing within a virtual machine of the process-based virtualization system.

16. A method for process-based virtualization, the method comprising:

granting, by at least one computer processor, an operating system, a secure application, a non-secure application, and a firmware of a process-based virtualization system access to a first memory component of a computer readable storage media, wherein the firmware and the secure application are permitted access to a second memory component of the computer readable storage media and the operating system and the non-secure application are prohibited from accessing the second memory component;

modifying, by the at least one computer processor, the data processing unit to operate in a first mode of operation such that the data processing unit executes the non-secure application using the operating system; and modifying, by the at least one computer processor, the data processing unit to operate in a second mode of operation such that the data processing unit executes the secure application using the firmware and application code of the secure application is executed using the second memory component.

17. The method of claim 16, the method comprising:

receiving, by the at least one computer processor, a system call from a process, wherein the system call indicates that the secure application is being stored in an encrypted format in the first memory component;

responding, by the at least one computer processor, to reception of the system call by modifying the data processing unit to operate in the second mode of operation;

copying, by the at least one computer processor, the encrypted secure application in the second memory component;

decrypting, by the at least one computer processor, the secure application in the second memory component;

generating, by the at least one computer processor, up an address translation structure that provides access to data in the second memory component and the first memory component by the decrypted secure application; and executing, by the at least one computer processor, the decrypted secure application such that the second memory component is accessed using the address translation structure.

18. The method of claim 16, the method comprising:

receiving, by the at least one computer processor, a process initialization system call from a process indicating the secure application being stored in encrypted format in the first memory component;

responding, by the at least one computer processor, to reception of the process initialization system call, by configuring the data processing unit to operate in the second mode of operation;

copying, by the at least one computer processor, the encrypted secure application in the second memory component and decrypting the secure application in the second memory component; and generating, by the at least one computer processor, an address translation structure that grants the decrypted secure application access to data in the second memory component and the first memory component.

19. The method of claim 16, wherein the address translation structure includes a partition table and a secure process table, wherein the partition table and secure process table are stored in the second memory component, and wherein generating the address translation structure includes adding, to the partition table, (i) a partition entry that points to the secure process table, and (ii) a process entry that is associated with a secure application process of the secure application, wherein the process entry points to a secure application address translation tree that enables translation of effective addresses to physical addresses.

20. A computer program product for process-based virtualization, the computer program product comprising a computer readable storage medium having program instructions embodied therewith, wherein the computer readable storage medium is not a transitory signal per se, the program instructions executable by a device to cause the device to perform a method comprising:

granting an operating system, a secure application, a non-secure application, and a firmware of a process-based virtualization system access to a first memory component of a computer readable storage media, wherein the firmware and the secure application are permitted access to a second memory component of the computer readable storage media and the operating system and the non-secure application are prohibited from accessing the second memory component;

modifying the data processing unit to operate in a first mode of operation such that the data processing unit executes the non-secure application using the operating system; and modifying the data processing unit to operate in a second mode of operation such that the data processing unit executes the secure application using the firmware and application code of the secure application is executed using the second memory component.

* * * * *